Nov. 10, 1964
H. HARTY ETAL
3,156,625
CORE FOR A SUPERCRITICAL PRESSURE POWER REACTOR
Filed Oct. 22, 1962
5 Sheets-Sheet 2
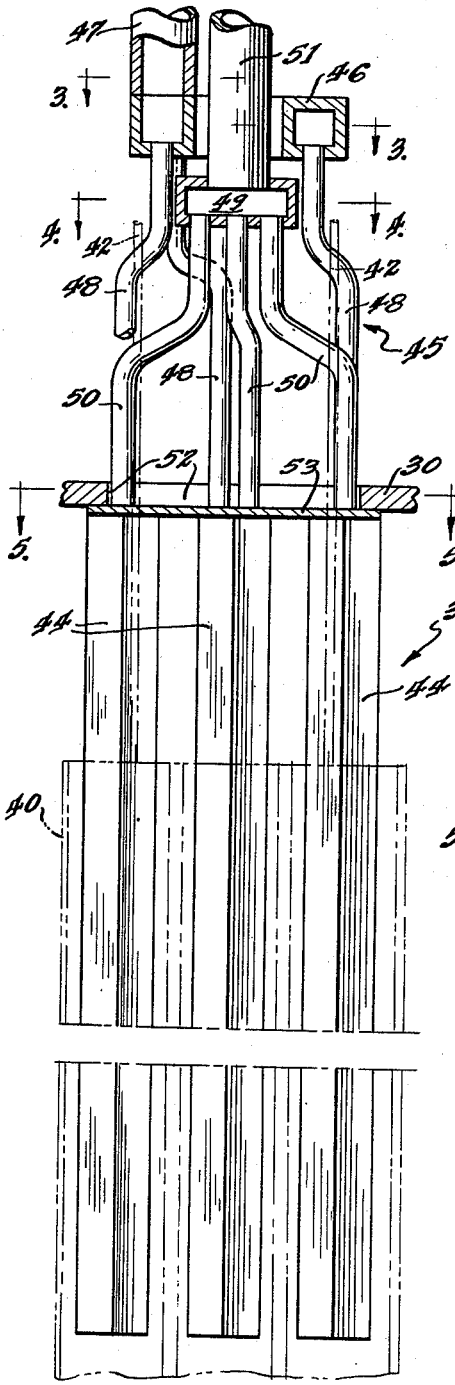
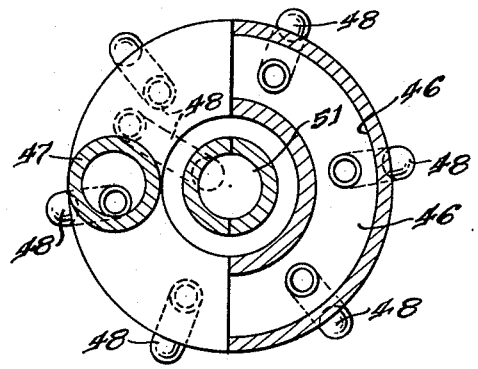
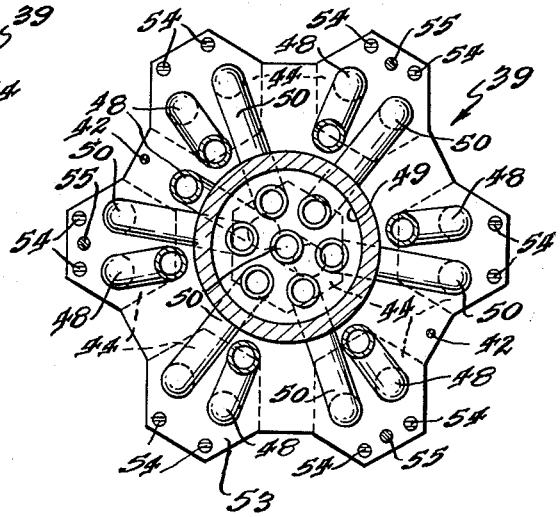
INVENTORS
H. HARTY
J. REGIMBAL
K. TOYODA
R. WIDRIG
BY
ATTORNEY Nov. 10, 1964     H. HARTY ETAL     3,156,625
CORE FOR A SUPERCRITICAL PRESSURE POWER REACTOR
Filed Oct. 22, 1962     5 Sheets-Sheet 3
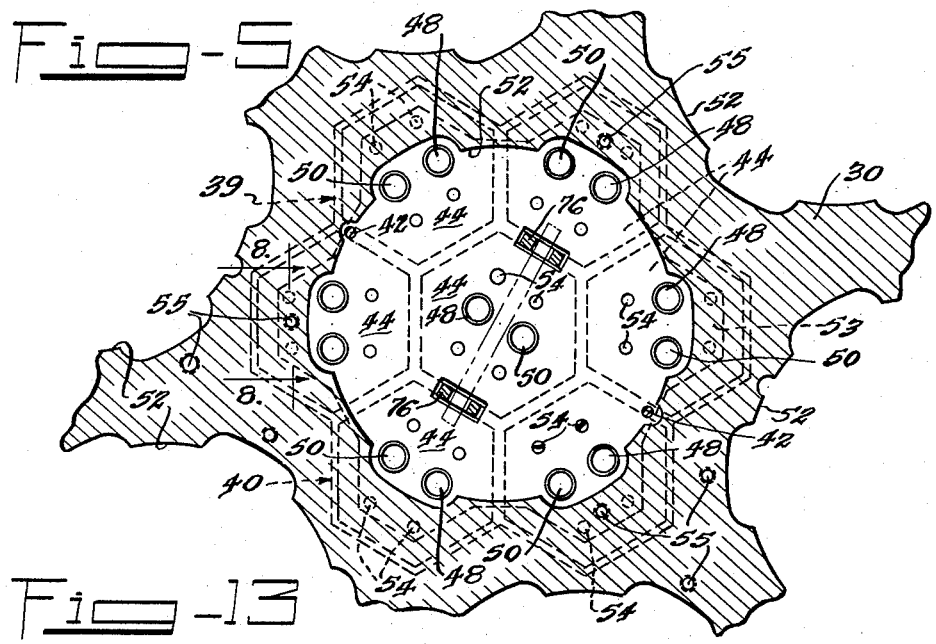
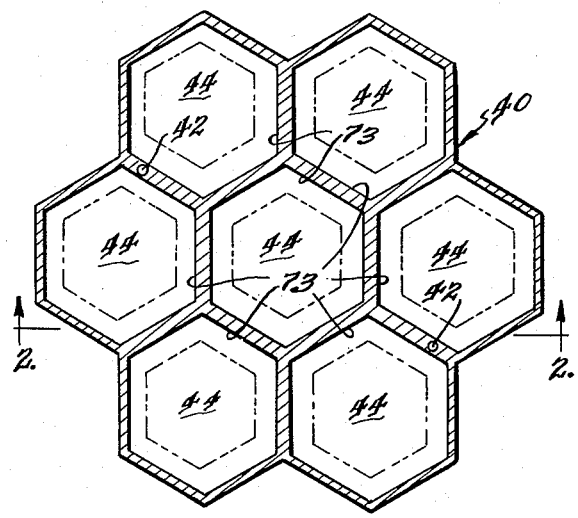
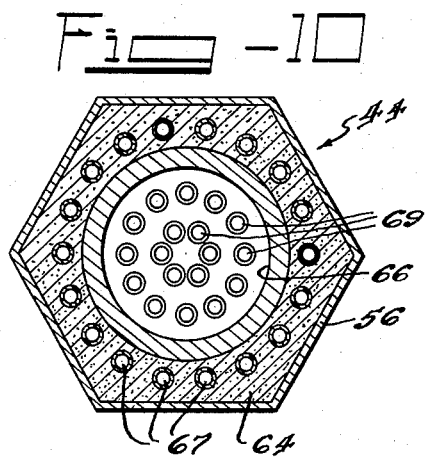
INVENTORS
H. HARTY
J. REGIMBAL
K. TOYODA
R. WIDRIG
BY
ATTORNEY

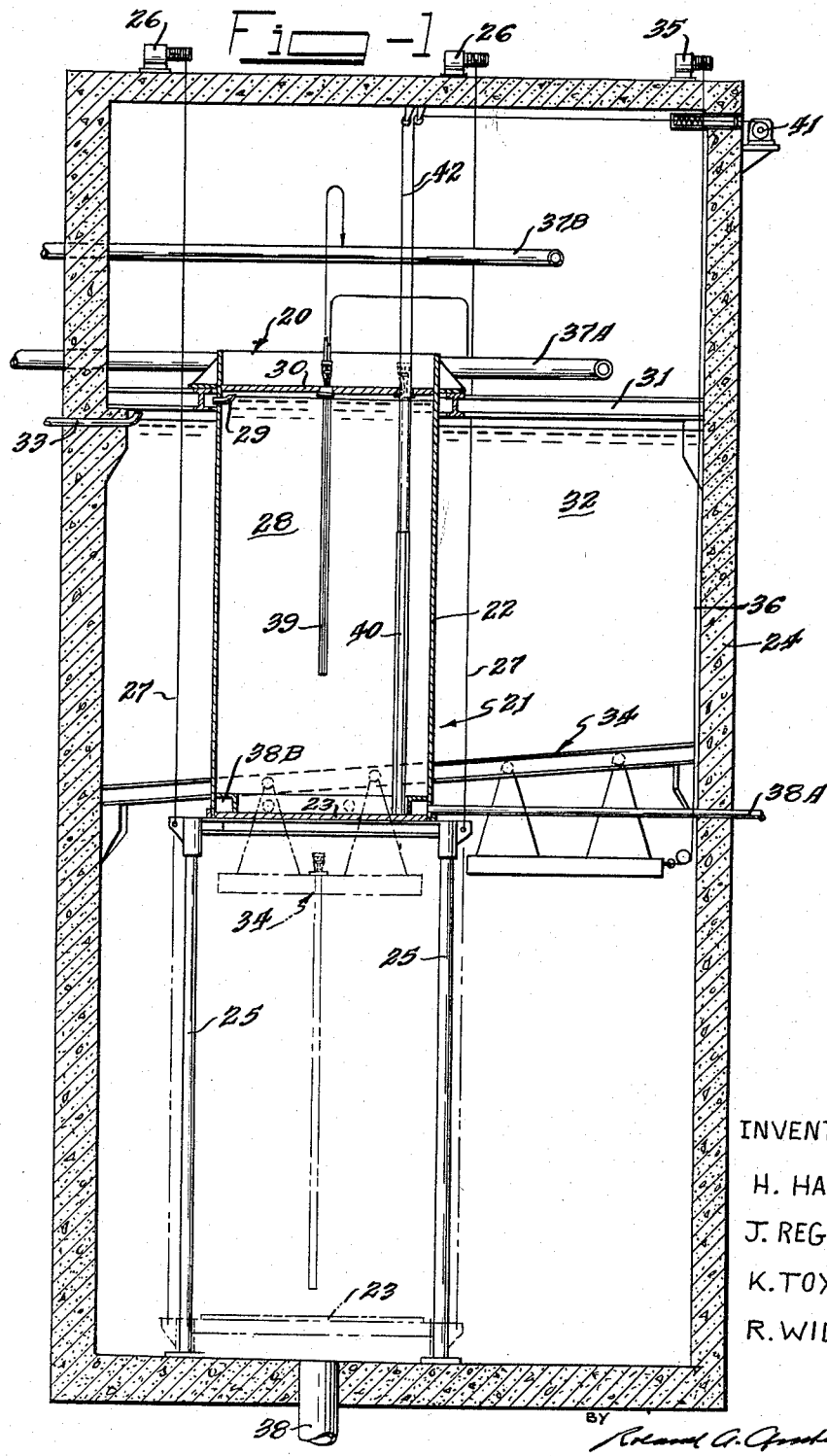

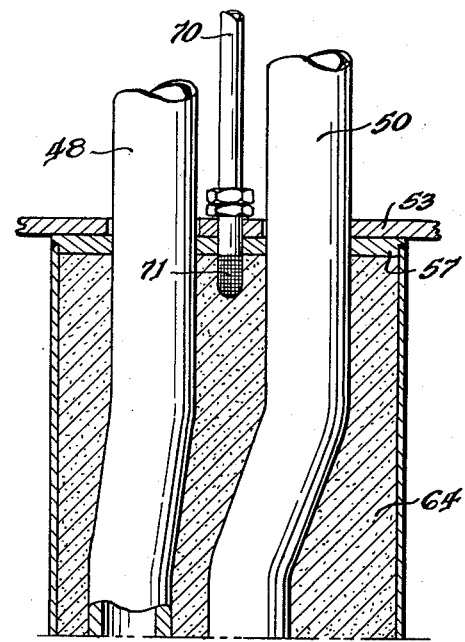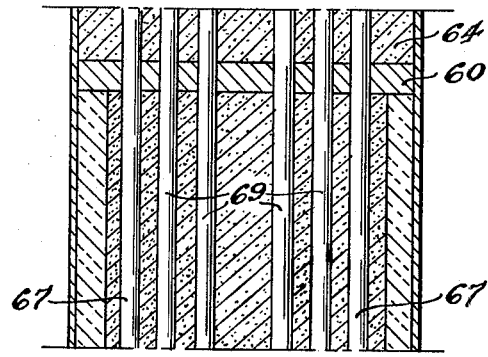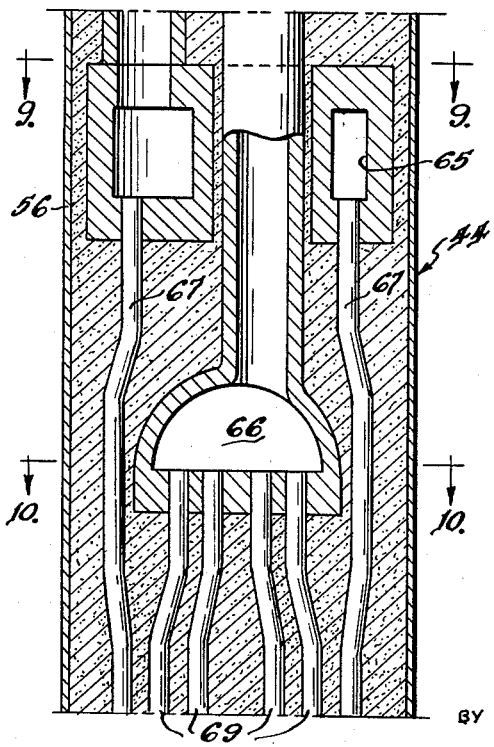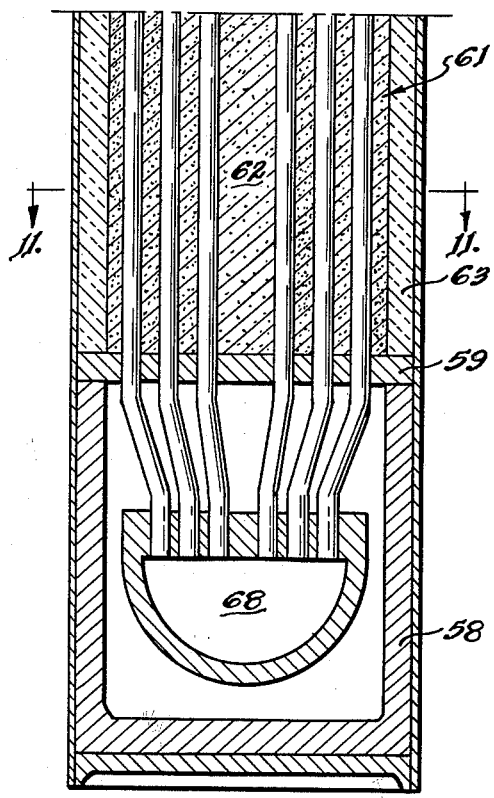
INVENTORS
H. HARTY
J. REGIMBAL
K. TOYODA
R. WIDRIG Nov. 10, 1964
H. HARTY ETAL
3,156,625
CORE FOR A SUPERCRITICAL PRESSURE POWER REACTOR
Filed Oct. 22, 1962
5 Sheets-Sheet 5
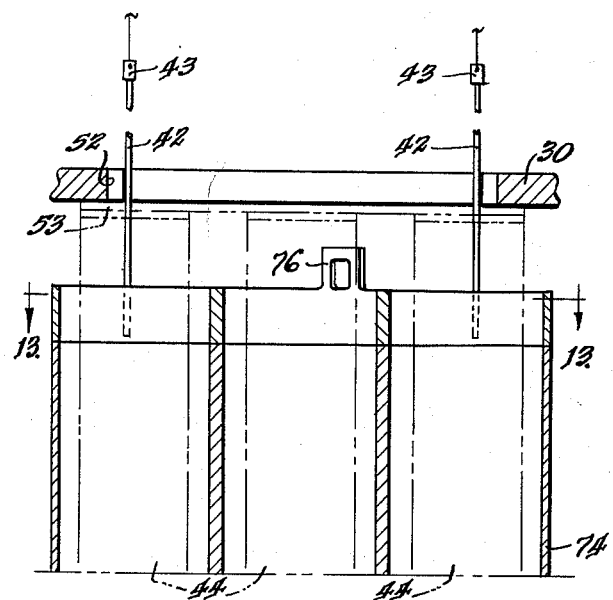
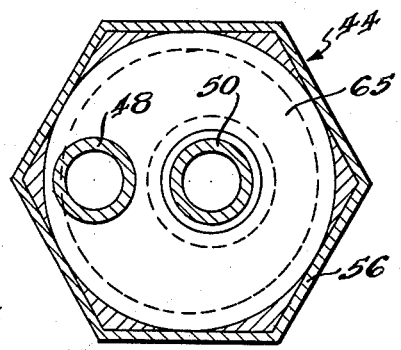
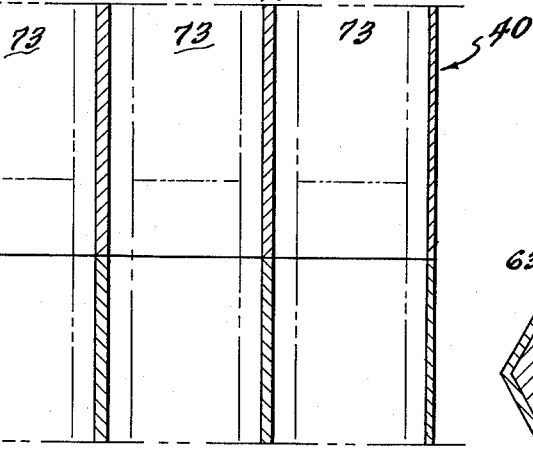
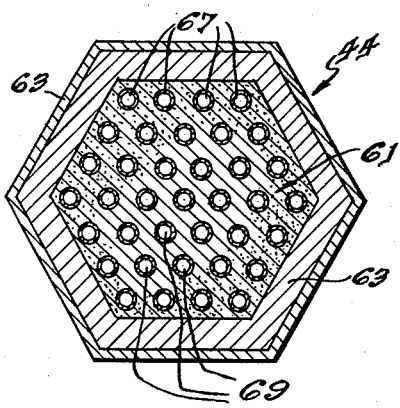
INVENTORS
H. HARTY
J. REGIMBAL
K. TOYODA
R. WIDRIG
BY
ATTORNEY

United States Patent Office 3,156,625
Patented Nov. 10, 1964

3,156,625
CORE FOR A SUPERCRITICAL PRESSURE
POWER REACTOR
Harold Harty and James J. Regimbal, Richland, Kadzuhisa G. Toyoda, Pasco, and Richard D. Widrig, Richland, Wash., assignors to the United States of America as represented by the United States Atomic Energy Commission
Filed Oct. 22, 1962, Ser. No. 232,315
3 Claims. (Cl. 176—40)

This invention relates to a direct-cycle, water-cooled, supercritical-pressure power nuclear reactor. In more detail the invention relates to a novel control element and to a novel fuel element for use in said reactor. The invention relates specifically to a novel fuel-element control-element subassembly for a supercritical-pressure power reactor wherein these elements cooperate in a unique manner.

It is well known that increasing the temperature and pressure of operation of the working fluid of a power plant increases the thermal efficiency of the power generating cycle. Higher thermal efficiencies, if not accompanied by proportional increases in capital investment or operating expense, will lower power generation costs.

Although working fluids other than ordinary water are at least potentially available for power plant use, the low cost of water and the high state of development of materials of construction make water the usual choice of power plant designers.

In recent years fossil-fueled power plants have been constructed which are designed to operate at above the critical temperature and pressure of water to take advantage of the increased thermal efficiency over operation at lower temperatures and pressures. If nuclear power plants are to be competitive with fossil-fueled plants, their thermal efficiency obviously should approach or exceed that of fossil-fueled plants. It is desirable therefore to operate nuclearly heated, steam power plants at above the critical temperature and pressure of water. Thermal efficiencies of greater than 40% are theoretically possible in a power plant operated at supercritical pressure and temperatures in contrast to an efficiency of 25 to 30% obtained in extant power plants incorporating a boiling-water or pressurized-water reactor.

Another parameter which partially determines economy of power derived from a nuclear power plant is the reactor power density. In general the cost of power derived from a reactor having a small core and a high power density is lower than the cost of power derived from a reactor having a large core and a lower power density.

It is accordingly an object of the present invention to develop a light-water-cooled nuclear reactor having a high power density designed to operate at supercritical pressure and temperature.

It is also an object of the present invention to develop a fuel element capable of producing superheated steam interiorly thereof while retaining a moderate temperature at the surface thereof.

It is another object of the invention to develop a novel control element for reactors incoporating internally cooled fuel elements.

It is a more specific object of the present invention to develop a unique fuel-element control-element subassembly for a supercritical-pressure power reactor.

These and other objects of the present invention are attained in a nuclear reactor incorporating a plurality of internally cooled fuel elements suspended in a pool of water at atmospheric pressure. Cooling water is passed through pressure tubes in the fuel elements at supercritical pressure and temperature. The reactor is controlled by honeycomb-shaped control elements which enclose and interpenetrate a cluster of the fuel elements thereby serving to protect the reactor against rupture of a pressure tube.

The present reactor incorporates internally cooled fuel elements because experience has shown that materials of construction are available from which relatively small pressure tubes can be constructed which are capable of containing steam under supercritical conditions. On the other hand, no materials of construction are now known from which a large pressure vessel could be constructed which would contain steam at a temperature of greater than 705° F. and a pressure of greater than 3193 lbs./sq. in.—the critical temperature and pressure of water.

Because of the relatively high power density of a nuclear reactor constructed according to the present invention, high temperature-pressure tube materials can be used which would be prohibitively expensive in fossil-fueled steam generators with their extended heat transfer surface or which would be uneconomic to use in a reactor having a low power density.

The invention will next be described with reference to the accompanying drawings wherein, FIG. 1 is a vertical sectional view of a nuclear reactor according to the present invention, with many parts omitted for clarity, FIG. 2 is a longitudinal sectional view of a fuel cluster therefor which shows a control assembly in phantom and is taken in the direction of the arrows 2—2 in FIG. 13, FIG. 3 is a transverse sectional view taken in the direction of the arrows 3—3 in FIG. 2, FIG. 4 is a transverse sectional view taken in the direction of the arrows 4—4 in FIG. 2, the core support grid being omitted for clarity, FIG. 5 is a transverse sectional view taken in the direction of the arrows 5—5 in FIG. 2, FIG. 6 is a longitudinal sectional view of the top portion of a fuel element for the reactor, FIG. 7 is a longitudinal sectional view of the bottom portion of the said fuel element, FIG. 8 is a partial sectional view taken in the direction of the arrows 8—8 in FIG. 5, FIG. 9 is a transverse sectional view taken in the direction of the arrows 9—9 in FIG. 6, FIG. 10 is a transverse sectional view taken in the direction of the arrows 10—10 in FIG. 6, FIG. 11 is a transverse sectional view taken in the direction of the arrows 11—11 in FIG. 7, FIG. 12 is a vertical sectional view taken through a control element for the reactor, which shows the fuel cluster in phantom, and FIG. 13 is a horizontal sectional view thereof taken in the direction of the arrows 13—13 in FIG. 12.

Referring first to FIG. 1, the reactor according to the present invention comprises a core 20 disposed in a rector vessel 21 comprising a cylindrical shell 22 and a movable bottom plate 23 which in turn is disposed in a concrete enclosure 24. Movable bottom plate 23 is guided and supported by rods 25 and raised and lowered by motors 26 through cables 27. Core 20 is immersed in a pool of water 28 serving as moderator, the surface of which is determined by an overflow 29 located just below a core support grid 30. Core support grid 30 and cylindrical shell 22 are supported from concrete enclosure 24 by beams 31. A pool of water 32 serving as shield is disposed in concrete enclosure 24 exterior to reactor vessel 21. The level of water in pool 32 is lower than it is in pool 28 as shown by the location of overflow 33. A transverse charging conveyor 34 operated by motor 35 through cable 36 is also provided and also shown in this figure are representative coolant inlet and outlet ducts 37A and 37B, a drain pipe 38 and water supply pipes 38A connecting to a header 38B located just above bottom plate 23.

Core 20 includes 85 fuel clusters 39, which are suspended from grid 30, and 85 control elements 40 which enclose and interpenetrate each of the 85 fuel clusters. Control elements 40 are operated by motors 41 operating through cables 42. Stops 43 (see FIG. 12) prevent the control elements 40 from falling through the bottom of the reactor.

Concrete enclosure 24 is 66 feet deep and 32 feet in width while cylindrical shell 22 is 12 feet in diameter and 33 feet in length. Thus there is at least 8 to 10 feet of water completely surrounding the reactor core.

As shown in FIGS. 2 to 5 a fuel cluster 39 includes seven hexagonal fuel elements 44 arranged in a hexagonal pattern 1¾ inches apart and a fuel element header assembly 45. Fuel element header assembly 45 includes an annular inlet header 46, a single header inlet pipe 47 leading thereto from coolant inlet duct 37A (see FIG. 1), seven fuel element inlet pipes 48 leading from inlet header 46 to fuel elements 44, a centrally located outlet header 49, seven fuel element outlet pipes 50 leading from the fuel elements 44 to outlet header 49, and a single header outlet pipe 51 leading away from header 49 to coolant outlet duct 37B.

Core support grid 30 includes 85 openings 52 shaped and of a size such that fuel element header assembly 45 will just pass therethrough. Openings 52 are covered on their underside by a plate 53. Fuel elements 44 are attached to plate 53 by fasteners 54 and the outermost fuel elements 44 are attached to the grid 30 by bolts 55. (See also FIG. 8.)

As shown in FIGS. 6, 7, 9, 10 and 11, a fuel element 44 comprises a hexagonal zircaloy jacket 56 having zircaloy end caps 57. A hollow graphite cup 58 is disposed in zircaloy jacket 56 at one end thereof facing inwardly, and a zirconium oxide spacer member 59 is disposed diametrically across the open end of the graphite cup 58. Another zirconium oxide spacer member 60 is disposed diametrically across jacket 56 at about the midpoint thereof. The volume between spacers 59 and 60 constitutes a fuel zone 61 which includes an active portion 62 composed of uranium dioxide and an annular thermal insulation zone 63 surrounding the active portion 62 and comprised of zirconium dioxide slabs. The remainder of the jacket 56 is filled with zirconium dioxide powder 64.

Fuel element inlet and outlet pipes 48 and 50 respectively penetrate the end cap 57 which is farthest from fuel zone 61, inlet pipe 48 terminating in an annular distribution chamber 65 which is surrounded by zirconium dioxide powder 64 and outlet pipe 50 passing through chamber 65 and terminating in the spherical portion of a hemispherical collecting chamber 66.

A plurality of inlet pressure tubes 67 extend through fuel zone 61 between annular distribution chamber 65 and the flat portion of a hemispherical return chamber 68 which is disposed in graphite cup 58. Inlet tubes 67 are disposed in a circle about the periphery of the fuel zone 61. A plurality of outlet pressure tubes 69 extend between return chamber 68 and collecting chamber 66 inside the circle of inlet tubes 67. Also provided is a fission gas relief tube 70, the inlet of which is covered by a screen 71.

Fuel elements 44 are 22 feet long and about two inches across flats, containing a 10-foot long block of enriched uranium dioxide disposed 13 inches from one end of the fuel element and 11 feet from the other end. Fuel elements 44 contain 18 inlet pressure tubes 67 and 18 outlet pressure tubes 69. All of the pressure tubes are $\frac{3}{16}$ inch I.D. with an average wall thickness of about 27 mils and are formed of "Hastelloy X," a high temperature nickel-base alloy.

The insulating material between the uranium dioxide fuel and the unpressurized water surrounding the fuel elements is calcium-oxide-stabilized zirconia. This material was selected because it has very low heat conductivity; it is compatible with uranium dioxide at elevated temperatures; and it maintains its properties after high exposure to radiation.

Pressure tubes 67 and 69 and chambers 65, 66 and 68 are fabricated as a bundle. This bundle is placed in hexagonal jacket 56 along with the zirconium dioxide thermal insulation. Particulate, fused uranium dioxide powder is then introduced into jacket 56 and the powder is compacted about the tube bundle by vibration compaction. A density of 90 to 92% of the theoretical density is attained.

A very important part of the present invention is disclosed in FIGS. 12 and 13. Means for controlling the reactor consist of the same number of elongated, honeycomb-shaped control elements 40 as there are fuel clusters 39. Control elements 40 enclose and interpenetrate each of the fuel clusters 39. They include six hexagonal cells 73 surrounding a single central hexagonal cell 73. Control elements 40 are 20 feet long of which the top 10 feet constitutes a poison section 74 and the bottom 10 feet constitutes a follower section 75. Poison section 74 is constructed of ⅜-inch thick stainless steel except the outside rim where control elements adjoin which is $\frac{3}{16}$ inch thick. Follower section 75 is of identical dimensions and is constructed of aluminum.

In operation of the power plant, condensate at 91.7° F. from the turbine condenser is deaerated, prefiltered and polished in mixed-bed deionizers. Three stages of low pressure regenerative heating from the moderator raise the condensate temperature to 158° F. The condensate is heated further to 286.2° F. in three stages of low pressure feedwater heaters by steam extraction from the main turbine. The last stage of this heating sequence is a de-aerating heater.

The feedwater is pressurized by booster pumps to provide the necessary head for the turbine-driven main feedpumps, then raised to 4600 p.s.i.g., and further heated to 540.3° F. by four stages of steam extraction from the main turbine. The feedwater enters the reactor at 540.3° F. and about 4500 p.s.i.g. The fluid temperature is raised to 805° F. in a first pass through the reactor and to 1050° F. in a second pass. Following the second pass, the supercritical pressure fluid flows to reheat heat exchangers, where heat is transferred from the 1050° F. supercritical pressure fluid to both the exhaust steam of the high pressure and the first reheat units of the turbine. The regenerative heating raises the reheat steam temperature to 1000° F. and reduces the supercritical pressure fluid temperature to 821° F. The fluid is returned to the reactor for final heating to 1050° F. before entering the turbine at 3500 p.s.i.g.

The net heat rate based on actual electrical output of the plant described is 7935 B.t.u./kwh. and the corresponding net plant efficiency is 43.0 percent.

The reactor is moderated with light water. Because of nuclear heating in the moderator 28 and control elements 40 and the heat loss from the fuel elements 44, the moderator coolant stream initially is maintained apart from the surrounding water shielding 32 by cylinder shell 22 which is open at the top but closed at the bottom by movable bottom plate 23. Water is introduced at the bottom of the reactor vessel 21 by means of supply pipes 38A and header 38B at 90° F. and is dispersed upwardly in the approximately ⅝-inch gaps formed by the fuel elements 44 and the control elements 40. A moderator flow rate of 3800 g.p.m. is required to keep the maximum local temperature to less than 200° F. The average moderator temperature leaving the top of the tank is 164° F.

The overflow from the reactor vessel 21 is retained in the reactor pool and mixes with the shield water. The moderator and primary systems are separated to avoid primary system contamination in case of fuel element failure.

The reactor described has several advantages over conventional power reactors which have heretofore been built. In the first place there is no large and expensive pressure vessel, the pressure tubes 67 and 69 taking its place. Second, the unpressurized moderator simplifies fuel handling and control rod installation and permits the use of water for shielding. Also, by employing light water as working fluid a direct cycle can be used between the reactor and the turbine, and finally, the absence of high temperature water in reservoir quantities permits low pressure containment and the housing of all the facility within the contained volume.

It is apparent that one of the primary hazards in the reactor described arises from the very high temperature and pressure of the working fluid. It is evident that it is not possible to construct pressure tubes of realistic dimensions which will never be subject to rupture due to the very high temperature and pressure of the steam contained therein. Such a rupture could have calamitous effects if it were not restricted to a single fuel element.

Accordingly the control elements 40 for this reactor are so designed as to contain the effect of rupture of any one pressure tube to the fuel element within which it is located. Each cell 73 of the honeycomb arrangement of the control elements 40 contains one fuel element 44. The thickness of the material from which the control element is made is sufficient to withstand any conceivable incident created by the rupture of a pressure tube. The control elements contain not only a poison section 74 but also a follower section 75 of the same dimensions as the poison section. Each fuel element 44 is enclosed by either the poison section of a control element or the follower section at all times it is in the reactor. When the control section 74 is withdrawn and has no effect on the reactivity of the reactor the follower section 75 is disposed enclosing each fuel element separately in the reactor core. Thus a degree of safety is attainable which was believed unattainable economically in a supercritical-pressure power reactor.

It will be necessary to replace fuel elements in the reactor from time to time because of ruptures and depletion of the fuel. The basic unit in the fuel handling operation is the cluster 39 of seven fuel elements. All fuel is handled within the reactor pool and, with the exception of the transverse conveyor 34, all operations are performed from the operating level with an auxiliary portable crane.

To discharge an irradiated fuel element, the control element 40 is withdrawn to its uppermost position where handles 76 extend above grid plate 30. A retaining bar is then inserted through handles 76 as shown in FIG. 5, whereupon cable 42 can be disconnected and the control element 40 rests on the fuel cluster 39. The coolant piping 47 and 49 is then disconnected by cutting the piping immediately prior to discharge and temporarily plugging the lines as by freezing. The mechanism holding the fuel element cluster 39 to the core support grid 30 is removed and the cluster lowered into the transverse conveyor 34 under the core along with the control element 40. The cluster is moved to a storage rack (not shown) adjacent to the reactor for cooling. The control element is left in the conveyor to receive the new fuel element cluster.

To charge the reactor a new fuel element cluster is lowered into the transverse conveyor 34 and inserted in the previously discharged control element. The inlet and outlet cooling lines to the cluster are sealed to prevent water entry during the transfer. The new cluster is placed under its lattice position and raised into the reactor core where it is attached to the core support grid at the reactor top face. The cooling lines are attached to their respective pipes and the control mechanisms are assembled.

It will be understood that the invention is not to be limited to the details given herein but that it may be modified within the scope of the appended claims.

What is claimed is:

1. A core for a supercritical pressure power reactor comprising a plurality of parallel, elongated fuel elements each containing a plurality of pressure tubes for coolant, and a plurality of control elements comprising one portion containing a material having a high capture cross section for thermal neutrons and a follower portion of a material having a low capture cross section for thermal neutrons, each of said control elements consisting of a grid encompassing and interpenetrating a number of said fuel elements, the number and arrangement of control elements being such that each fuel element in the reactor is surrounded by a control element at all times.

2. A core for a supercritical pressure power reactor according to claim 1 wherein said fuel elements are hexagonal in shape, and said control elements are honeycomb in shape.

3. A core for a supercritical pressure power reactor according to claim 2 wherein the material having a high capture cross section for thermal neutrons is stainless steel, the follower portion is aluminum, each control element encloses seven fuel elements arranged in a hexagonal pattern and there are a total of eighty-five control elements.

References Cited in the file of this patent

UNITED STATES PATENTS

| | | |
|---|---|---|
| 2,861,035 | Zinn | Nov. 18, 1958 |
| 2,900,316 | Kaufman et al. | Aug. 18, 1959 |
| 2,935,456 | Huston | May 3, 1960 |
| 3,030,292 | Ritz | Apr. 17, 1962 |
| 3,030,293 | Wyatt | Apr. 17, 1962 |
| 3,033,773 | Schluderberg et al. | May 8, 1962 |
| 3,054,741 | Tatlock et al. | Sept. 18, 1962 |
| 3,081,248 | Grant | Mar. 12, 1963 |

FOREIGN PATENTS

| | | |
|---|---|---|
| 1,177,317 | France | Dec. 1, 1958 |
| 1,046,209 | Germany | Dec. 11, 1958 |
| 880,662 | Great Britain | Oct. 25, 1961 |
| 348,212 | Switzerland | Sept. 30, 1960 |